United States Patent [19]

Voorhees

[11] 3,796,487

[45] Mar. 12, 1974

[54] METHOD FOR PRODUCTION OF ILLUSTRATED TEXTS

[75] Inventor: Charles H. Voorhees, Burbank, Calif.

[73] Assignee: Lockheed Aircraft Corporation, Burbank, Calif.

[22] Filed: Jan. 12, 1973

[21] Appl. No.: 323,324

[52] U.S. Cl. .......................... 355/77, 95/1.1, 95/12, 355/20, 355/43

[51] Int. Cl. .......................... G03b

[58] Field of Search .......................... 95/1, 1.1, 12; 355/20, 355/40–43, 66, 77

[56] References Cited

UNITED STATES PATENTS

| | | | |
|---|---|---|---|
| 3,537,788 | 11/1970 | Young | 355/40 |
| 3,626,824 | 12/1971 | Kolb et al. | 355/40 X |
| 3,673,932 | 7/1972 | Rottmiller | 355/43 X |
| 3,673,933 | 7/1972 | Hamann | 95/1.1 |
| 3,677,146 | 7/1972 | Nielsen | 95/1.1 |

*Primary Examiner*—Samuel S. Matthews
*Assistant Examiner*—Richard A. Wintercorn
*Attorney, Agent, or Firm*—Billy G. Corber; Ralph M. Flygare

[57] ABSTRACT

A method for the high speed production of illustrated texts, particularly customized aircraft parts catalogs, wherein textual material is photographically combined with designated illustrative material and the text is prepared from the composite photographic record. Data including the textual material and illustration identifying indicia is stored in a data bank and is periodically duplicated to provide a master data record. The master data record, preferably a magnetic tape, is then utilized to generate an illustrated text containing all textual and illustrative data applicable to a particular customer. To generate the customized illustrated text, the stored textual material is selectively electronically displayed to expose a photographic film. Illustration identifying indicia associated with displayed textual material is utilized to select a slide containing the desired illustrative material and an image of the illustrative material from the slide is projected onto the film to form a composite photographic record. The illustrated text may then be formed from the composite photographic record. A method for generating indices and a table of contents for the customized catalog as well as forms and labels for various types of catalog tables and illustrations is also disclosed.

10 Claims, 11 Drawing Figures

FIG. 7A

LOCKHEED L1011 TriStar

ILLUSTRATED PARTS CATALOG

| FIG.ITEM | PART NUMBER | 1234567 NOMENCLATURE | EFFECT FROM TO | UNITS PER ASSY |
|---|---|---|---|---|
| 1 - 1 | 1548301-103 | TRANSDUCER INSTL, HORIZ STABILIZER POSITION (REQD IN 27-00-00 FIG.01) | | RF |
| 5 | MS17825-3 | .NUT | | 2 |
| 10 | AN960D10 | .WASHER | | 2 |
| 15 | 728818-110 | .BOLT, DRILLED SHANK (V36659) (MAKE FROM NAS5203U10) | | 2 |
| - 20 | 1548296-101 | .LINK ASSY, STABILIZER POSN | | 1 |
| 25 | KSP3LF5428 | ..BEARING, BALL (V21335) | | 2 |
| 30 | LS12644-10A020C | ..SLEEVE, BEARING RETENTION (V36659) | | 1 |
| 35 | 1548296-103 | ..LINK | | 1 |
| 40 | LH7559-3 | .NUT, SELF-LOCKING (V72962) | | 1 |
| 45 | AN960D10 | .WASHER | | 1 |
| 50 | NAS5203U11 | .BOLT | | 1 |
| - 55 | 1548295-101 | .ARM ASSY, STABILIZER POSN | | 1 |
| 60 | LS10020-3A7 | ..BUSHING, PLAIN (V36659) | | 1 |
| 65 | 1548295-103 | ..ARM | | 1 |
| - 70 | 1548298-101 | .BRACKET ASSY, STABILIZER POSN TRANSDUCER | | 1 |
| | | ATTACHING PARTS | | |
| - 75 | LH7559-3 | .NUT, SELF-LOCKING (V72962) | | 2 |
| - 80 | AN960D10 | .WASHER | | 2 |
| - 85 | NAS5203U4 | .BOLT | | 2 |
| | | ---*--- | | |
| 90 | LS10020-3A7 | ..BUSHING, PLAIN (V36659) | | 1 |
| 95 | 1548298-103 | ..BRACKET | | 1 |
| 100 | LH7559-4 | .NUT, SELF-LOCKING (V72962) | | 1 |
| 105 | AN960D416 | .WASHER | | 1 |
| 110 | NAS6404U22 | .BOLT | | 1 |
| 115 | 797-8007-003 | .TRANSDUCER, POSITION SINGLE (V13499) (672305-103) | | 1 |
| 120 | 1548300-101 | .SUPPORT, STABILIZER POSN TRANSDUCER | | 1 |
| | | ATTACHING PARTS | | |
| -125 | LH7559-3 | .NUT, SELF-LOCKING (V72962) | | 3 |
| -130 | AN960D10 | .WASHER | | 3 |
| -135 | NAS5203U4 | .BOLT | | 3 |
| | | ---*--- | | |
| 300 | LS10166R14-7SN | PLUG, SINGLE POSITION TRANSDUCER ELEC (V36659) (COMPONENT OF WIRE HARNESS) | | 1 |

-ITEM NOT ILLUSTRATED

FIG. 7B

LOCKHEED L1011 TriStar

ILLUSTRATED PARTS CATALOG

| SUBJECT | CHAPTER SECTION SUBJECT | FIGURE | EFFECT |
|---|---|---|---|
| KEELSON | 53-14-00 | | |
| KEELSON INSTL, FS 923 TO 1480 | 53-14-01 | 1 | |
| BRACKET, TENSION TIE LH | | | |
| DOOR ASSY, LH | | | |
| HINGE ASSY, HIDDEN | | | |
| LATCH ASSY, ACCESS DOOR | | | |
| SENSOR, PROXIMITY | | | |
| STRUCTURE ASSY, KEELSON | | | |
| TUBE ASSY, BL 16 | | | |
| STRUCTURE ASSY, KEELSON COMPLETE | 53-14-02 | 1 | |
| BEAM INSTL, FS 983 TO 1212 | | | |
| DOOR INSTL, FS 1233 | | | |
| PANEL ASSY, FS 1003 TO | | | |
| WALKWAY ASSY, FS 1243 TO | | | |
| SUPPORT INSTL, RAM AIR TURBINE KEELSON | 53-14-03 | 1 | |
| BUSHING, PLAIN | | | |
| FITTING, SUPPORT | | | 001014 |
| FUSELAGE DOOR FRAMES | 53-15-00 | | |
| PANEL INSTL, P-1 DOOR SCUFF | 53-15-06 | 1 | |
| BALL, DRAIN VALVE | | | |
| FITTING ASSY, DRAIN | | | |
| GASKET DOOR DRAIN | | | |
| PANEL, P-1 PASSENGER TUBE | | | |
| PANEL ASSY, MAIN CABIN FLOOR | | | |

PATENTED MAR 12 1974 3,796,487

SHEET 08 OF 10

FIG. 7D

LOCKHEED L1011 TriStar

ILLUSTRATED PARTS CATALOG

| PART NUMBER | AIRLINE PART NUMBER | CH-SECT-UNIT-FIG-ITEM | TTL. REQ. |
|---|---|---|---|
| 1533042-122 | | 57-36-12- 01 -120 | 2 |
| 1533052-115 | | 57-36-05- 01 40 | 1 |
| 1533052-117 | | 57-36-12- 01 100 | 2 |
| 1533052-119 | | 57-36-05- 01 45 | 1 |
| 1533052-120 | | 57-36-05- 01 - 50 | 1 |
| 1533052-121 | | 57-36-12- 01 105 | 1 |
| 1533052-122 | | 57-36-12- 01 110 | 1 |
| 1533057-103 | 19-1376 | 27-51-34- 01 110 | 2 |
| 1533069-101 | | 27-13-01- 01 - 1 | RF |
| | | 27-13-02- 01 - 1 | RF |
| | | 27-62-01- 01 - 1 | RF |
| | | 57-00-00- 02 180 | 1 |
| 1533069-102 | | 27-13-01- 01 - 5 | RF |
| | | 27-13-02- 01 - 5 | RF |
| | | 27-62-01- 01 - 5 | RF |
| | | 57-00-00- 02 -185 | 1 |
| 1533069-111 | | 22-13-03- 01 195 | 1 |
| | | 27-13-01- 01 165 | 2 |
| 1533069-113 | | 22-13-03- 01 1 | RF |
| | | 27-13-01- 01 130 | 2 |
| | | 27-13-01- 01 170 | 2 |
| 1533069-115 | | 22-13-03- 01 1A | RF |
| | | 27-13-01- 01 130A | 2 |
| | | 27-13-01- 01 170A | 2 |
| 1533070-101 | 19-3079 | 22-13-03- 01 35 | 1 |
| | | 27-13-01- 01 40 | 2 |
| | | 27-13-01- 01 205 | 2 |
| | | 27-13-02- 01 30 | 4 |
| | | 27-62-01- 01 30 | 4 |
| 1533070-103 | | 22-13-03- 01 55 | 1 |
| | | 27-13-01- 01 60 | 2 |
| | | 27-13-01- 01 225 | 2 |
| | | 27-13-02- 01 50 | 4 |
| | | 27-62-01- 01 50 | 4 |
| 1533071-101 | | 57-52-02- 01 75 | 2 |
| | | 57-52-04- 01 95 | 3 |
| | | 57-52-05- 01 95 | 3 |
| | | 57-52-06- 01 95 | 2 |
| 1533072-101 | | 57-55-02- 01 65 | 2 |
| | | 57-55-04- 01 250 | 1 |
| 1533073-101 | 19-0234 | 27-13-01- 01 80 | 2 |
| | | 27-62-01- 01 70 | 4 |
| 1533073-103 | 19-0232 | 27-13-02- 01 70 | 2 |
| 1533073-105 | | 27-13-01- 01 90 | 2 |
| 1533074-101 | | 27-13-01- 01 100 | 1 |
| | | 27-13-02- 01 - 95 | 1 |
| | | 27-62-01- 01 90 | 2 |

-ITEM NOT ILLUSTRATED

TW

FIG. 7E

LOCKHEED L1011 TriStar

ILLUSTRATED PARTS CATALOG

| PART NUMBER | AIRLINE PART NUMBER | CH-SECT-UNIT-FIG-ITEM | TTL. REQ. |
|---|---|---|---|
| AC8818E101 | | 27-61-09- 01 130 | RF |
| AC8818E103 | | 27-11-45- 01 55 | RF |
| SEE 740749-103 | | 27-21-18- 01 50 | RF |
| SEE 740149-103 | | | |
| AC8818E105 | | 27-41-20- 01 95 | RF |
| SEE 740749-105 | | | |
| AC9221F11 | 873-5187 | 29-11-30- 01 155 | 4 |
| SEE 740801-101 | | 29-11-31- 01 50 | RF |
| | | 29-11-54- 01 25 | 4 |
| | | 29-11-73- 01 50 | RF |
| AC9222-24D24 | | 29-11-51- 01 45 | 4 |
| | | 29-11-72- 01 45 | 6 |
| AC9222F1 | 873-5188 | 29-11-22- 01 40 | 8 |
| SEE 740802-101 | | 29-11-26- 01 20 | 4 |
| AC9255F201 | 873-5189 | 29-11-29- 01 40 | 4 |
| SEE 740834-101 | | 29-11-74- 01 180 | RF |
| AC9780F1 | | 24-11-10- 01 265 | RF |
| AD44897 | | 32-51-02- 01 180 | 2 |
| SEE 741192-101 | | | |
| AD9221-164 | | 29-11-30- 01 150 | 4 |
| SEE 671759-105 | | 29-11-31- 01 - 1 | RF |
| AD9221-165 | | 29-11-54- 01 30 | 4 |
| SEE 672764-105 | | 29-11-73- 01 - 1 | RF |
| AD9320-202 | | 29-11-29- 01 35 | 4 |
| SEE 672029-105 | | 29-11-74- 01 - 1 | RF |
| AD9410-61 | 86-8522 | 38-11-03- 01 165 | 2 |
| SEE 672438-107 | | 38-11-08- 01 225 | 2 |
| | | 38-11-10- 01 85 | 3 |
| | | 38-11-10- 01 180 | 3 |
| | | 38-11-11- 01 135 | 2 |
| | | 38-11-11- 01 310 | 2 |
| | | 38-11-18- 01 115 | 1 |
| | | 38-11-25- 01 320 | 1 |
| | | 38-11-26- 01 380 | 2 |
| AD9410-61D1A | 86-8563 | 38-11-26- 01 395 | 2 |
| SEE 672438-109 | | | |
| AD9410-67 | | 38-11-10- 01 180A | 3 |
| SEE 672438-113 | | 38-11-11- 01 310A | 2 |
| | | 38-11-26- 01 380A | 2 |
| AD9410F11 | 86-8564 | 38-11-26- 01 400 | 2 |
| SEE 672438-111 | | | |
| AD9410F17 | | 38-11-26- 01 400A | 2 |
| SEE 672438-115 | | | |
| AEB6350037 | | 25-23-32- 01 -130 | 3 |
| AEC6350013 | | 25-23-32- 01 125 | 3 |
| AED4082102 | | 27-61-13- 01 100 | 10 |
| SEE 672483-103 | | 27-61-25- 01 30 | 2 |
| | | 27-61-36- 01 1 | RF |

-ITEM NOT ILLUSTRATED

TW

METHOD FOR PRODUCTION OF ILLUSTRATED TEXTS

BACKGROUND OF THE INVENTION

The present invention relates to a method for producing illustrated texts and more specifically to a method for rapidly selecting and combining textual material with illustrative material in the production of customized catalogs such as aircraft parts catalogs.

Illustrated texts have been produced in the past largely through the use of manual techniques. For example, in producing parts catalogs in which a large number of illustrations accompanying textual material, the illustrations are ordinarily prepared photographically and are manually attached in their proper positions on pages of text prepared manually or on a printer. This method of producing illustrated text is extremely burdensome where the illustrated text is standard for all equipment and where the equipment remains virtually unchanged during its life. However, in the event that each customer is supplied with quipment customized to its specifications and where large numbers of revisions are made in the equipment during its life as in the aircraft industry, production of maintenance and/or parts catalogs by conventional techniques is even more time consuming and expensive.

For example, an aircraft manufacturer may provide different features in a particular aircraft model in accordance with each customer's specifications. Each customer must therefore have its own customized maintenance and/or parts catalog with which to maintain its aircraft and to order spare parts for the maintenance of its aircraft. Moreover, because of the large number of engineering changes made during the life of an aircraft, a customer may require a new catalog for its aircraft on as frequent as a monthly basis.

To produce a customized parts catalog with an illustrated text, each illustrated page must be prepared by the above described photographic method. The pages composed in this manner may not be usable in catalogs for other customers since the merging of textual and illustrative materials may not occur in the same manner in subsequent catalogs. Thus, for each catalog it may be necessary to recompose each page of the illustrative and textual materials.

It is accordingly an object of the present invention to provide a novel method for producing illustrated texts.

It is a further object of the present invention to provide a novel method for rapidly and economically producing customized illustrated texts and particularly illustrated parts catalogs.

It is yet another object of the present invention to provide a novel method for combining textual material with illustrations wherein the textual material is produced electronically and the illustrations are selectively combined with the textual materials in response to an indication accompanying the textual material.

It is yet a further object of the present invention to provide a novel method for producing customized illustrated texts wherein textual material including accompanying illustration indicating indicia is stored and portions of the textual material are selected and displayed electronically for combination with an optically projected illustration selected in response to the indicia.

These and other objects and advantages of the present invention will become apparent to one skilled in the art to which the invention pertains from a perusal of the following detailed description when read in conjunction with the attached drawings.

THE DRAWINGS

DETAILED DESCRIPTION

The description of the present invention is organized as set out, in the following Table of Contents:

TABLE OF CONTENTS

I. General System Description (FIG. 1)
II. Input Data System (FIGS. 2 and 3)
  A. Data Storage and Editing (FIGS. 2 and 3)
  B. Input Data Format
  C. Master Tape Data Format
    1. Carriage Control
    2. Accounting Data
    3. Text Data
III. Catalog Customizing (FIGS. 4–6)
  A. Control Unit (FIG. 4)
    1. Data Customizing (FIG. 5)
    2. Catalog Paginating and Formatting
  B. Output Format (FIGS. 7A–7E)
IV. Program Listing

I. General System Description

Figure 1:
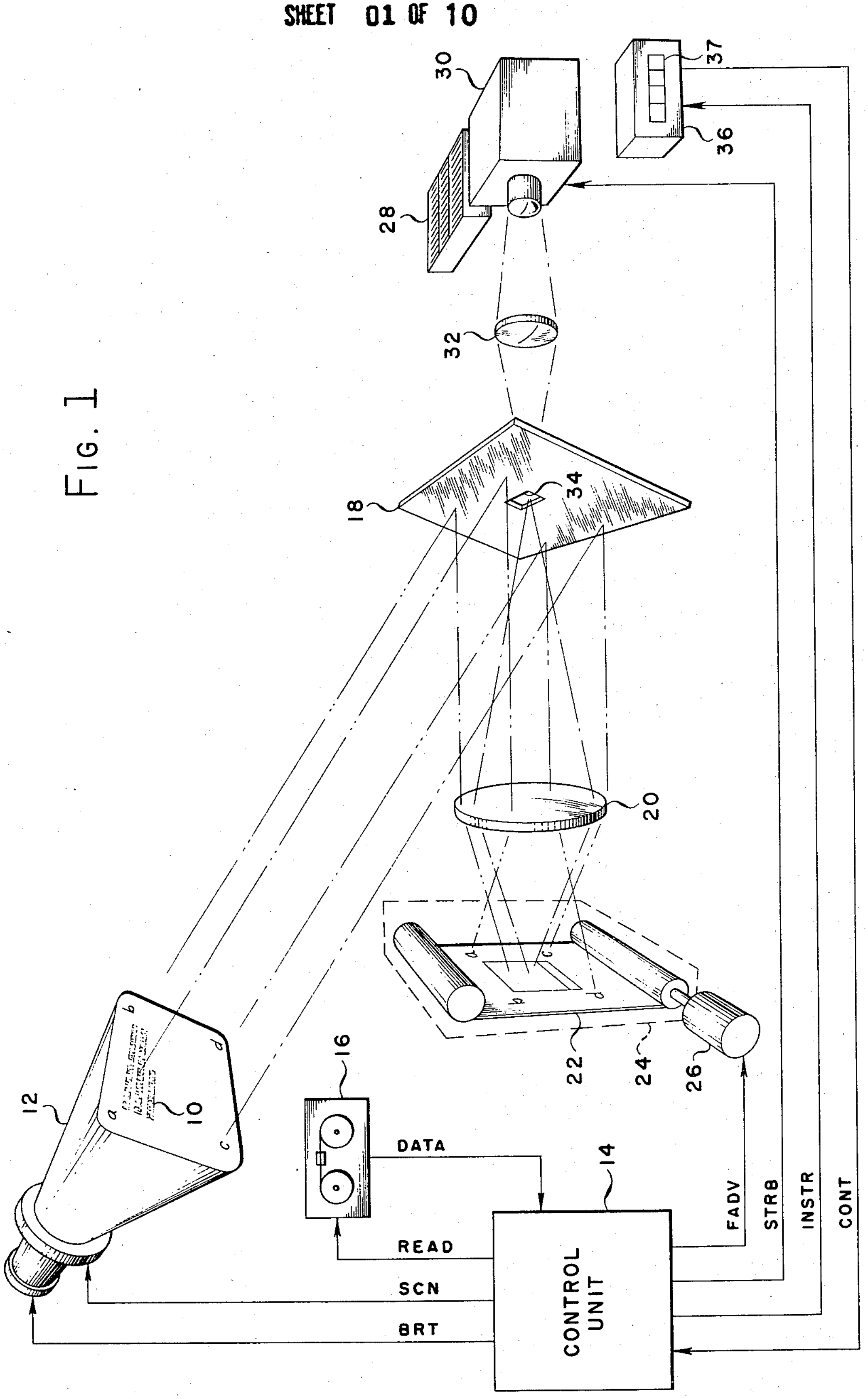
FIG. 1 is a functional block diagram pictorially illustrating the system of the present invention.

A system for producing illustrated texts in accordance with the present invention is illustrated pictorially in block diagram form in FIG. 1 to facilitate an understanding of the present invention.

Referring now to FIG. 1, textual material generally indicated at 10 may be electronically formed and displayed in a suitable conventional manner such as by controlling the scanning of a cathode ray tube 12 in response to output signals from a control unit 14. For example, stored textual material including other data such as identifying codes and illustration identifying indicia may be read from a magnetic tape or other suitable storage means by a tape reader 16 in response to a read command or a READ signal from the control unit 14.

The output signal from the tape-reader 16 may be applied to the control unit 14 as the DATA signal and portions of the DATA signal may be selected by the control unit 14 for display in accordance with a code identifying those portions to be displayed. The selected portions of the DATA signal may then be processed by the control unit 14 in any suitable conventional manner to provide cathode ray tube scan and brightness control signals SCN and BRT, respectively, to thereby provide electronic display of the selected portions of the textual material.

The image of the textual material 10 on the face of the cathode ray tube 12 may be reflected by a suitable reflector 18 and focused through a suitable lens system generally indicated at 20 onto an image plane defined by a suitable photographic material such as the illustrated film 22. The film 22 may be, for example, sprocked or unsprocked 16 or 35 millimeter microfilm mounted in a suitable camera indicated in phantom at 24. A suitable film advance motor 26 in the camera 24 or externally thereof may be energized in response to a film advance or FADV signal from the control unit 14 to advance the film 20 a predetermined amount, e.g., one microfilm frame.

A large number of illustrations, preferably in the form of slides, may be cataloged in any suitable manner as is generally indicated at 28 to permit rapid retrieval of a selected slide. An image of an illustration may be projected from the selected slide by a slide projector 30 through a suitable lens system 32, through the reflector 18 and the lens system 20 and onto the image plane defined by the film 22 in the camera 24 in response to a strobe or STRB signal from the control unit 14.

The reflector 18 may be any suitable conventional device such as a dichroic mirror which reflects all light striking one side thereof but allows light striking the other side thereof to pass therethrough, thus permitting the image from the slide projector 24 to pass therethrough. Alternately, the reflector 18 may be a mirror provided with a small aperture 34 sufficient in size to pass the zero order defraction pattern of the projected image. Mirror and lens optical systems suitable for combining images in the manner described above are described in U.S. Pat. Nos. 3,673,932 and No. 3,673,933.

A suitable conventional input/output unit (I/O unit) 36 such as a conventional typewriter and/or pushbutton control unit may be provided for control and visual display purposes. For example, the input/output unit 36 may be utilized to enter a control signal CONT such as a customer identifying code, a start code and/or a continue code into the control unit 14 as is subsequently described in detail in connection with FIG. 2. The entered code may control, for example, the reading of the DATA signal from the tape reader 16, the selection and electronic display of textual material on the face of the cathode ray tube and the merging of textual and illustrative material.

Moreover, the input/output unit 36 may provide the operator of the slide projector 30 with visual instructions during the production of the illustrated text. For example, an instruction or INST signal may be supplied from the control unit 14 and effect the typing or other display of illustration identifying indicia as is indicated at 37 when an illustration is to be merged with textual material as will be subsequently described in greater detail.

In operation, a data bank or memory containing the most current data as to the textual material and the illustrations to be inserted in the textual material for all customer catalogs may be read and stored for subsequent use by the control unit 14 as is hereinafter described in detail in connection with FIGS. 2 and 3. In the FIG. 1 embodiment, for example, the catalog data in the data bank may be stored in a suitable coded form on magnetic or punched tape and read by the control unit 14 from the tape reader 16 as the DATA signal in response to the READ signal.

The operator may commence the production of the customized catalog by typing or otherwise generating, at the input/output unit 36, a customer identification code and a "start" instruction to command the control unit 14 to commence the reading of data from the tape reader 16 and to generate a customized catalog for the identified customer. As the stored data is read, the data to be included in the customized catalog is selected in accordance with accompanying codes and ordered for display and subsequent production of a catalog. As will subsequently be described, the textual material may be generated by the DATA signal or merely contained in the DATA signal and designated for display.

Textual portions of the data either designated or generated for display are displayed by generating analog cathode ray tube control signals BRT and SCN in a suitable conventional manner. For example, the first series of pages generated or designated for display in accordance with the invention may include a title page and several table of contents pages. The control unit 14 may electronically display each successive page and record each page on a frame of the film 22. In this connection, the electronically displayed image of the textual material may be reflected by the mirror 18 onto an image plane defined by the film 22 and properly focused on the image plane by the lens system 20. At the end of each page as determined by the control unit 14, the control unit 14 may generate the film advance or FADV signal to advance the film 22 one frame.

As the production of the customized parts catalog proceeds in this manner, spaces or entire pages on which illustrative material is to be inserted may be indicated by the DATA signal. Where illustrative material is to be added, textual material such as headings or descriptions, figure numbers and page numbers may be electronically displayed on the cathode ray tube 12 and an instruction signal INSTR identifying the illustration to be inserted in the textual material may be displayed on the display 37 of the input/output unit 36.

The operator may then select from the tray 28 the slide upon which the illustration designated for display appears and place the selected slide into the slide projector 30. The operator may then instruct the control unit 14 to continue and the control unit 14 may then generate the strobe signal STRB to strobe the slide projector 30. The strobing of the slide projector 30 effects the projection of the image of the illustrative material on the slide onto the image plane defined by the film 22 through the lens systems 20 and 32 and the mirror 18. The alignment of the optical system and the predetermined position of the illustration on the slide insure proper registration of the textual and illustrative material on the film 22 thus providing the desired composite photographic record.

The instruction from the operator may also generate the film advance signal FADV a short time later to advance the film 22 one frame and, after the film has been advanced, to generate the READ signal to continue reading data from the tape reader 16. This process may continue with the control unit 14 automatically displaying and recording textual material and pausing for the insertion of designated illustrative material in accordance with the method of the present invention as is hereinafter described in greater detail.

Of course, the slides utilized to combine illustrative material with the electronically displayed textual material may be selected automatically in response to the INSTR signal from the control unit 14 in any suitable conventional manner. After automatically selecting the slide, the insertion of the slide into the slide projector 30 may effect the automatic generation of the continue signal to inform the control unit 14 that the slide containing the desired illustrative material is available for projection onto the film 22. In this manner, the production of the customized catalog from the tape on the tape reader 16 may be entirely automated, requiring an operator solely for the purpose of changing tapes and starting the process once the desired tape is in place.

The customized catalog may be compiled and the control unit 14 may operate to display textual material on the cathode ray tube 12 and to generate the various signals required during the production of a customized parts catalog as is disclosed in copending U.S. Pat. application Ser. No. 323,328 by Charles H. Voorhees for "Method and System for Production of Illustrated Texts," filed concurrently herewith and assigned to the assignee of the present invention. The disclosure of this Voorhees application is hereby incorporated herein by reference. Another way in which these and other functions may be performed is hereinafter described in connection with FIGS. 2–6 and the accompanying computer program listing.

II. Input Data System

A. Data Storage and Editing

In accordance with the present invention, customized illustrated texts are preferably produced through the use of one or more general purpose digital computers programmed to perform various functions hereinafter described in detail in connection with the flow diagrams of FIGS. 2–6. In this regard, the control unit 14 of FIG. 1 is preferably a general purpose digital computer such as a Model No. 516 computer available from Honeywell, Inc. A preferred embodiment of the method of the invention is described hereinafter in connection with the production of customized illustrated aircraft parts catalogs and a computer program for accomplishing this objective is provided. However, it should be noted that the invention may readily be adapted to the publishing of other illustrated texts by one skilled in the art. The following description and program, while directed to the production of customized illustrated aircraft parts catalogs, are thus intended to be illustrative and not restrictive.

Figure 2:
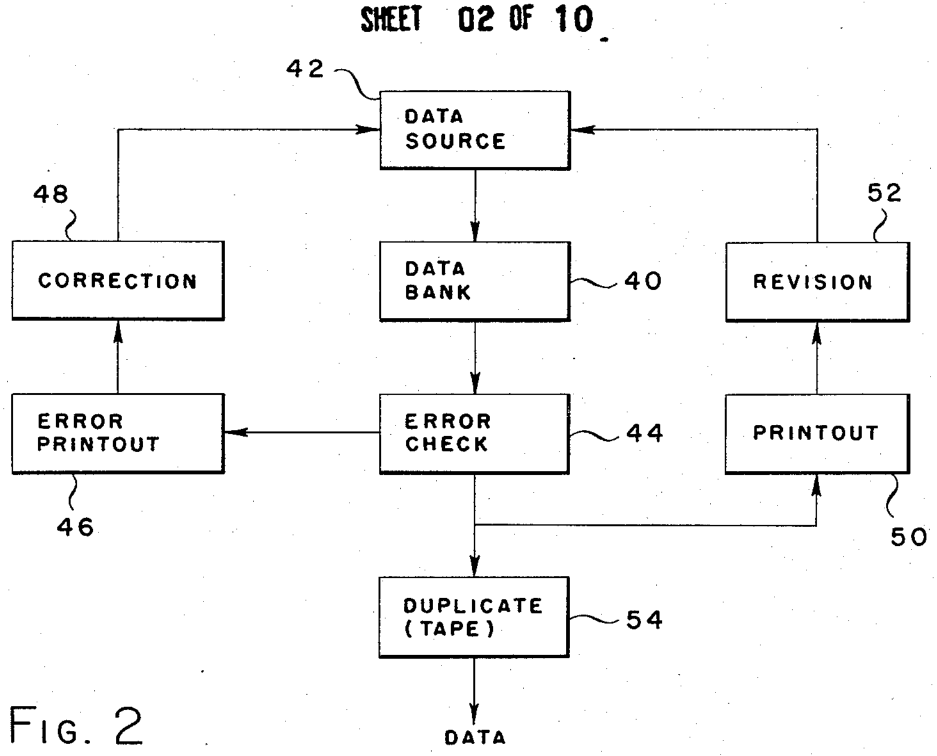
FIG. 2 is a flow diagram functionally illustrating the operation of the master tape generation subroutine of the present invention.

Referring now to FIG. 2, a suitable conventional computer data bank 40 may store all data required for the generation of an illustrated text such as an illustrated parts catalog for an aircraft. The data bank 40 may be continuously updated from a data source 42 such as one or more remotely located typewriters, card readers or the like connected to access the data bank 40 in a conventional manner. Where several input devices are utilized, access to the data bank 40 may be on a time-sharing basis.

For example, the data source 42 may be a commercially available model ATS/360 terminal which functions as a combination typewriter input/output device and is connected to the centrally located computer data bank 40 via two-way communication lines. The terminal may thus serve as both a means for the operator to enter information directly into the computer data bank 40 from the typewriter keyboard and as a computer controlled printer for printing information previously entered.

The input data entered into the computer data bank 40 may be checked for errors as is indicated by the error check block 44 and, if errors are found, an error printout may be provided to permit the correction or editing of the input data as is generally indicated at 46 and 48, respectively. If the data entered into the computer data bank 40 contains no errors as determined by the error check block 44, a printout of the data may be provided so that a record of the stored data is available for subsequent revision as is generally indicated at 50 and 52, respectively. In this manner, edited, current data is always available from the data bank 40.

As required, and preferably on at least a daily basis, all edited data required for catalog production is duplicated from the data bank 40 preferably on magnetic tape as is generally indicated at 54. This edited master tape may thereafter be utilized as was generally described in connection with FIG. 1 and as will be subsequently described in greater detail to produce customized catalogs as required by the customers.

Figure 3:
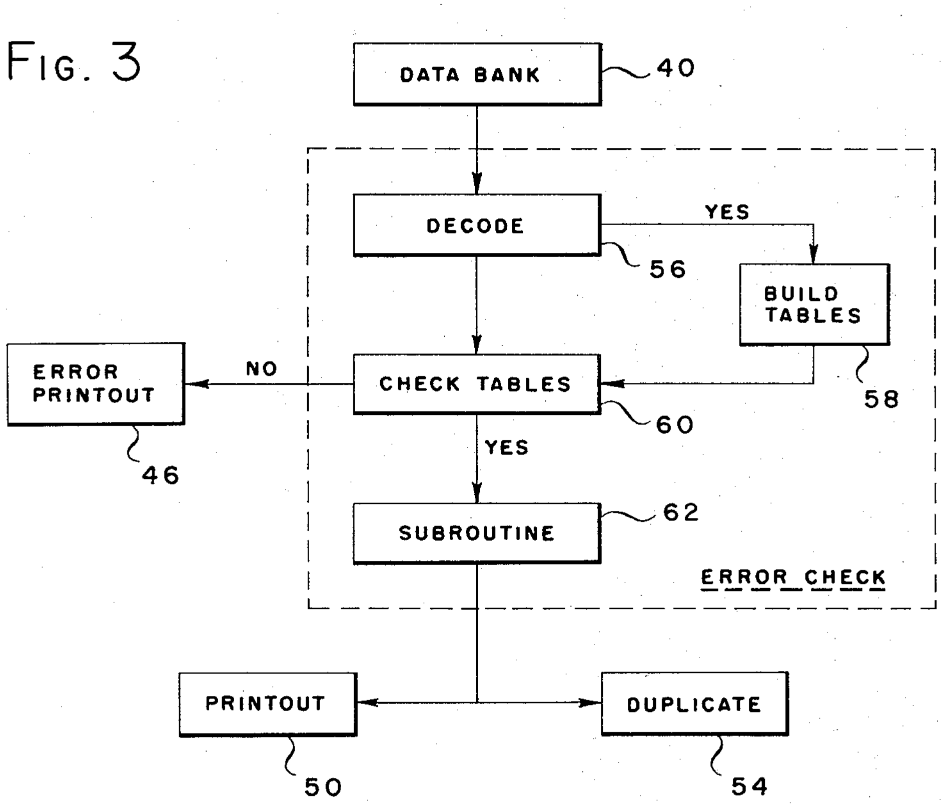
FIG. 3 is a flow diagram functionally illustrating in greater detail the error check function of FIG. 2.

The error check routine 44 of FIG. 2 is illustrated functionally in greater detail in FIG. 3 to facilitate an understanding of the invention. Referring to FIG. 3, the data stored in the computer data bank 40 is decoded as is generally indicated at 56 and utilized to build data tables in accordance with the record code as is indicated at 58. If for some reason, the data from the data bank 40 is not decoded as data to be placed in the tables, this data is checked against the tables and, if in error, results in an error printout as is indicated respectively at 60 and 62. After all of the data has been identified as being substantially error free through the building of the tables, the data may be duplicated by printing the data and recording the data on tape upon request in accordance with a suitable subroutine as is indicated at 64.

B. Input Data Format

The input data supplied to the data bank 40 from the data source 42 includes program control data and catalog record data. The program control data preferably includes record code description (RCD) data, catalog schedule record (CSR) data and serial master code (SMC) data. The catalog record data preferably includes introduction/foreword (INT) text data, figure identification record (FIR) data and catalog text records associated with the FIR data.

The record code description (RCD) data provides the various codes employed in connection with the text records together with a description or definition of each code. The first entry for all RCD data and, in fact, all input data, may be an entry date including the year and day as a Julian date, e.g., 69059; the 59th day of 1969 or Feb. 28, 1969. The next entry may indicate the type of data record, i.e., RCD, followed by a table usage code and a text record code indicating the table into which the associated text record is placed when the text data is tabulated as was previously described. A record code description may then be provided for operator information.

Examples of the format of the RCD input data supplied to the data bank 40 from the data source 42 for the generation of an illustrated aircraft parts catalog are provided in Table I as follows:

The revision time span may indicate the time spans to be used to determine whether information for that customer has been revised since the prior catalog publication.

The revision number may indicate the revision number of the catalog being produced for the customer and this number may appear on all text pages. The format and remarks may indicate to the operator that the catalog for a particular customer is to be on film, hard copies and the like and may indicate additional information such as the number of copies to be prepared for that customer.

TABLE I.—RECORD CODE DESCRIPTION (RCD)

| Entry date rec. YRDAYTYPE | Table usage | | | | | | | | | | | | | | | Code | Description of record code |
|---|---|---|---|---|---|---|---|---|---|---|---|---|---|---|---|---|---|
| | 1 | 2 | 3 | 4 | 5 | 6 | 7 | 8 | 9 | 0 | 1 | 2 | 3 | 4 | 5 | | |
| 69059RCD | | | | | | | | | | | | | | | | DAY | (69059) will be updated at terminal in lieu of console. |
| 69059RCD | | | | | | | | | | | | | | | | PCD | Record code description. |
| 69059RCD | | | | | | | | | | | | | | | | CSR | Catalog schedule record. |
| 69059RCD | | | | | | | | | | | | | | | | SMC | Serial master code. |
| 69059RCD | | | | | | | | | | | | | | | | INT | Introduction. |
| 69059RCD | | | | | | | | | | | | | | | | FIR | Figure identification record. |
| 69059RCD | Y | N | N | N | N | N | N | N | N | N | N | N | N | N | N | L | Identifies a Lockheed part numbered entry. |
| 69059RCD | Y | N | N | N | N | N | N | N | N | N | N | N | N | N | N | V | Identifies a vendor numbered entry. |
| 69059RCD | Y | N | N | N | N | N | N | N | N | N | N | N | N | N | N | B | Indicates buyer furnished equipment item entry. |
| 69059RCD | N | N | Y | N | N | N | N | N | N | N | N | N | N | N | N | A | Indicates the start of attaching parts. |
| 69059RCD | N | N | Y | N | N | N | N | N | N | N | N | N | N | N | N | E | Indicates the end of attaching parts. |
| 69059RCD | N | Y | N | N | N | N | N | N | N | N | N | N | N | N | N | S | Item contains service bulletin information. |
| 69059RCD | N | Y | N | N | N | N | N | N | N | N | N | N | N | N | N | T | Indicates a dummy title to be used in the table of contents. |
| 69059RCD | Y | N | N | N | Y | N | N | N | N | N | N | N | N | N | N | AC | Peculiar entry—Air Canada. |
| 69059RCD | Y | N | N | N | Y | N | N | N | N | N | N | N | N | N | N | DL | Peculiar entry—Delta Airlines. |
| 69059RCD | Y | N | N | N | Y | N | N | N | N | N | N | N | N | N | N | EA | Peculiar entry—Eastern Airlines. |
| 69059RCD | Y | N | N | N | Y | N | N | N | N | N | N | N | N | N | N | NE | Peculiar entry—Northeast Airlines. |
| 69059RCD | Y | N | N | N | Y | N | N | N | N | N | N | N | N | N | N | TW | Peculiar entry—Trans World Airlines. |
| 69059RCD | N | N | N | N | N | Y | N | N | N | N | N | N | N | N | N | MB | (Mod by P/N)=Modified by. |
| 69059RCD | N | N | N | N | N | Y | N | N | N | N | N | N | N | N | N | MK | (Mod from P/N)=Modified from. |
| 69059RCD | N | N | N | N | N | Y | N | N | N | N | N | N | N | N | N | US | (Used on P/N). |
| 69059RCD | N | N | N | N | N | Y | N | N | N | N | N | N | N | N | N | BY | (SUPSD by P/N)=Superseded by. |
| 69059RCD | N | N | N | N | N | Y | N | N | N | N | N | N | N | N | N | ES | (SUPS P/N)=Supersedes. |
| 69059RCD | N | N | N | N | N | Y | N | N | N | N | N | N | N | N | N | FS | (For spares replacement use P/N). |
| 69059RCD | N | N | N | N | N | Y | N | N | N | N | N | N | N | N | N | SF | (Spares replacement for P/N). |
| 69059RCD | N | N | N | N | N | Y | N | N | N | N | N | N | N | N | N | WX | (When exhausted use P/N). |
| 69059RCD | N | N | N | N | N | Y | N | N | N | N | N | N | N | N | N | UE | (Use P/N until exhausted). |
| 69059RCD | N | N | N | N | N | Y | N | N | N | N | N | N | N | N | N | NT | (Intrch P/N)=Interchangeable with. |
| 69059RCD | N | N | N | N | N | Y | N | N | N | N | N | N | N | N | N | RQ | (Reqd. by P/N)=Required by. |
| 69059RCD | N | N | N | N | N | Y | N | N | N | N | N | N | N | N | N | RM | (Rem. by P/N)=Removed by. |

The catalog schedule record (CSR) data may be utilized in determining the production schedule of catalogs for the various customers. Each record of the CSR Examples of the format of the CSR data supplied to the data bank 40 from the data source 42 are provided in Table II as follows:

TABLE II.—CATALOG SCHEDULE RECORD (CSR)

| Entry date rec. YRDAYTYPE | Cust code | Revision time span | | Catalog issue date | Rev. No. | Format | Additional remarks |
|---|---|---|---|---|---|---|---|
| | | From | Thru | | | | |
| 69059CSR | EA | 69025 | 70025 | Jan. 25, 1970 | ORG | 16 mm. film | Select Eastern Graphics-Prepare 120 duplicates in 3M Cartrid. |
| 69025CSR | TW | 69025 | 70031 | Jan. 31, 1970 | ORG | do | Use Master Graphic—Prepare plates for hard copy. |
| 69025CSR | DL | 69025 | 70046 | Feb. 15, 1970 | ORG | do | Use Master Graphic—Prepare 35 duplicates in Kodak packs. |
| 69025CSR | EA | 70026 | 70055 | Feb. 24, 1970 | 001 | | See original instructions. |
| 69025CSR | TW | 70032 | 70061 | Mar. 2, 1970 | 001 | | Do. |
| 69025CSR | DL | 70047 | 70076 | Mar. 17, 1970 | 001 | | Do. |
| 69025CSR | EA | 70056 | 70085 | Mar. 26, 1970 | 002 | | Do. |

data may include the entry date, the record type, i.e., CSR, the customer code, e.g., EA; TW; DL, the revision times span, the catalog issue data, the catalog revision number, the catalog format for that customer, and any additional remarks which may pertain to that customer.

The customer code may be a two digit code assigned to a customer such as a particular airline and may be utilized to establish applicable serial number and model number codes from the serial master code (SMC) data for subsequent selection of textual and illustrative data.

The serial master code (SMC) data provides a record of the serial number and model number data applicable to the various customers. The customer codes from the SCR data may be utilized to extract the proper SMC data from these records as was previously described. The SMC data may thereafter be utilized as will hereinafter be described in detail to select textual and illustrative data for a particular customer when producing a customized catalog.

Examples of the format and types of SMC data which may be employed are given in Table III as follows:

TABLE III.—SERIAL MASTER CODES (SMC)

| Entry date rec. YRDAYTYPE | Code 1 Model Serial No. | Code 1 Cust. | Code 2 Model Serial No. | Code 2 Cust. | Code 3 Model Serial No. | Code 3 Cust. | Code 4 Model Serial No. | Code 4 Cust. | Code 5 Model Serial No. | Code 5 Cust. | Code 6 Model Serial No. | Code 6 Cust. | Code 7 Model Serial No. | Code 7 Cust. | Code 8 Model Serial No. | Code 8 Cust. | Code 9 Model Serial No. | Code 9 Cust. | Code 0 Model Serial No. | Code 0 Cust. |
|---|---|---|---|---|---|---|---|---|---|---|---|---|---|---|---|---|---|---|---|---|
| 69059SMC | A1001 | EA | B1002 | TW | A1003 | EA | A1004 | EA | C1005 | DL | 1006 | -------- | A1007 | EA | B1008 | TW | A1009 | EA | C1010 | DL |
| 69059SMC | A1011 | EA | 1012 | -------- | A1013 | EA | C1014 | DL | A1015 | EA | A1016 | EA | C1017 | DL | D1018 | NE | A1019 | EA | A1020 | |
| 69059SMC | D1021 | NE | C1022 | DL | A1023 | EA | B1024 | TW | 1025 | -------- | A1026 | EA | B1027 | TW | 1028 | -------- | A1029 | EA | 1030 | EA |
| 69059SMC | B1031 | TW | E1032 | AC | 1033 | -------- | B1034 | TW | 1035 | -------- | B1036 | TW | B1037 | AC | E1038 | TW | 1039 | -------- | E1040 | AC |
| 69059SMC | B1041 | TW | B1042 | TW | E1043 | AC | B1044 | TW | 1045 | -------- | E1046 | AC | B1047 | TW | 1048 | -------- | B1049 | TW | 1050 | |
| 69059SMC | 1051 | -------- | B1052 | TW | 1053 | -------- | 1054 | -------- | B1055 | TW | 1056 | -------- | B1057 | TW | 1058 | -------- | F1059 | -------- | B1060 | TW |
| 69059SMC | B1061 | TW | 1062 | -------- | E1063 | TW | 1064 | -------- | G1065 | -------- | B1066 | TW | 1067 | -------- | B1068 | TW | 1069 | -------- | B1070 | TW |
| 69059SMC | 1071 | -------- | 1072 | -------- | 1073 | -------- | 1074 | -------- | 1075 | -------- | 1076 | -------- | 1077 | -------- | 1078 | -------- | 1079 | -------- | A1080 | EA |
| 69059SMC | 1081 | -------- | D1082 | NE | 1083 | -------- | C1084 | DL | A1085 | EA | 1086 | -------- | 1087 | -------- | 1088 | -------- | A1089 | EA | D1090 | NE |
| 69059SMC | 1091 | -------- | C1092 | DL | A1093 | EA | 1094 | -------- | 1095 | -------- | 1096 | -------- | A1097 | EA | D1098 | NE | 1099 | -------- | C1100 | DL |
| 69059SMC | A1101 | EA | 1102 | -------- | 1103 | -------- | 1104 | -------- | A1105 | EA | F1106 | -------- | B1107 | TW | C1108 | DL | A1109 | EA | 1110 | |
| 69059SMC | G1111 | -------- | 1112 | -------- | A1113 | EA | B1114 | TW | A1115 | FA | C1116 | DL | E1117 | AC | 1118 | -------- | 1119 | -------- | A1120 | EA |
| 69059SMC | B1121 | TW | 1122 | -------- | E1123 | AC | A1124 | EA | E1125 | AC | B1126 | TW | 1127 | -------- | 1128 | -------- | B1129 | TW | 1130 | |
| 69059SMC | 1131 | -------- | B1132 | TW | 1133 | -------- | 1134 | -------- | B1135 | TW | 1136 | -------- | 1137 | -------- | B1138 | TW | 1139 | -------- | 1140 | |
| 69059SMC | B1141 | TW | 1142 | -------- | 1143 | -------- | B1144 | TW | 1145 | -------- | 1146 | -------- | C1147 | DL | H1148 | -------- | B1149 | TW | 1150 | |
| 69059SMC | 1151 | -------- | B1152 | TW | 1153 | -------- | 1154 | -------- | B1155 | TW | 1156 | -------- | 1157 | -------- | 1158 | -------- | B1159 | TW | 1160 | |
| 69059SMC | 1161 | -------- | 1162 | -------- | 1163 | -------- | B1164 | TW | 1165 | -------- | 1166 | -------- | 1167 | -------- | 1168 | -------- | G1169 | -------- | 1170 | |
| 69059SMC | 1171 | -------- | 1172 | -------- | 1173 | -------- | 1174 | -------- | 1175 | -------- | H1176 | -------- | 1177 | -------- | 1178 | -------- | 1179 | -------- | 1180 | |
| 69059SMC | 1181 | -------- | 1182 | -------- | 1183 | -------- | 1184 | -------- | 1185 | -------- | 1186 | -------- | H1187 | -------- | 1188 | -------- | 1189 | -------- | 1190 | |
| 69059SMC | 1191 | -------- | 1192 | -------- | 1193 | -------- | 1194 | -------- | 1195 | -------- | 1196 | -------- | H1197 | -------- | 1198 | -------- | 1199 | -------- | 1200 | |
| 69059SMC | 1201 | -------- | 1202 | -------- | 1203 | -------- | 1204 | -------- | 1205 | -------- | 1206 | -------- | 1207 | -------- | 1208 | -------- | 1209 | -------- | 1210 | |
| 69059SMC | 1211 | -------- | 1212 | -------- | 1213 | -------- | 1214 | -------- | 1215 | -------- | 1216 | -------- | 1217 | -------- | 1218 | -------- | 1219 | -------- | 1220 | |
| 69059SMC | 1221 | -------- | 1222 | -------- | 1223 | -------- | 1224 | -------- | 1225 | -------- | 1226 | -------- | 1227 | -------- | 1228 | -------- | 1229 | -------- | 1230 | |
| 69059SMC | 1231 | -------- | 1232 | -------- | 1233 | -------- | 1234 | -------- | 1235 | -------- | 1236 | -------- | 1237 | -------- | 1238 | -------- | 1239 | -------- | 1240 | |
| 69059SMC | 1241 | -------- | 1242 | -------- | 1243 | -------- | 1244 | -------- | 1245 | -------- | 1246 | -------- | 1247 | -------- | 1248 | -------- | 1249 | -------- | 1250 | |
| 69059SMC | 1251 | -------- | 1252 | -------- | 1253 | -------- | 1254 | -------- | 1255 | -------- | 1256 | -------- | 1257 | -------- | 1258 | -------- | 1259 | -------- | 1260 | |
| 69059SMC | 1261 | -------- | 1262 | -------- | 1263 | -------- | 1254 | -------- | 1265 | -------- | 1266 | -------- | 1267 | -------- | 1268 | -------- | 1269 | -------- | 1270 | |
| 69059SMC | 1271 | -------- | 1272 | -------- | 1273 | -------- | 1274 | -------- | 1275 | -------- | 1276 | -------- | 1277 | -------- | 1278 | -------- | 1279 | -------- | 1280 | |
| 69059SMC | 1281 | -------- | 1282 | -------- | 1283 | -------- | 1284 | -------- | 1284 | -------- | 1286 | -------- | 1287 | -------- | 1288 | -------- | 1289 | -------- | 1290 | |
| 69059SMC | 1291 | -------- | 1292 | -------- | 1293 | -------- | 1294 | -------- | 1295 | -------- | 1296 | -------- | 1297 | -------- | 1298 | -------- | 1299 | -------- | 1300 | |

Remaining input data supplied to the data bank 40 from the data source 42 is preferably the catalog record data which includes the actual textual and illustrative material from which the catalogs are produced. The introduction/foreword (INT) data may provide introductory textual material which may be selected in accordance with customer codes for printing at the beginning of each customized catalog. Examples of the format of these types of input data are provided in Table IV as follows:

TABLE IV.—INTRODUCTION/FOREWORD (INT)

| Entry date rec. YRDAYTYPE | Text | |
|---|---|---|
| 69059INT | Purpose | |
| 69059INT | The Illustrated Parts Catalog has been prepared by the Lockheed California Company to assist customer personnel in requisitioning, storing and issuing replaceable aircraft components and in identifying new and reclaimed parts. It is not approved for any other purpose. | |
| 69059INT | Model | |
| 69059INT | This parts catalog covers the Eastern Airlines Lockheed L-1011 Tristar Jet Transport | EA |
| 69059INT | This parts catalog covers the TWA Lockheed L-1011 Tristar Jet Transport | TW |
| 69059INT | This parts catalog covers the Delta Airlines Lockheed L-1011 Tristar Jet Transport | DL |
| 69059INT | This parts catalog covers the Northeast Airlines Lockheed L-1011 Tristar Jet Transport | NE |
| 69059INT | This parts catalog covers the Air Canada Lockheed L-1011 Tristar Jet Transport | AC |
| 69059INT | Explanation of Customizing | |
| 69059INT | The Illustrated Parts Catalog has been designed to include only those part numbers applicable to the specific customer. | |
| 69059INT | Illustrations may contain item numbers not applicable to a given customer. However, the parts list will not show these nonapplicable items and, therefore will not necessarily contain consecutive item numbers. | |

TABLE V (A) Figure identification record (FIR)

| Entry date rec. YRDAYTYPE | Chapter | Section | Subject | Figure | Page |
|---|---|---|---|---|---|
| 69056FIR | 31 | 10 | 00 | 02 | 1 |

(B) Catalog test records

| Entry date rec. YRDAYTYPE | Non ill. | Item No. | Part number | Prop. indent. | Nomenclature | Model | Lockheed effectivity From | Lockheed effectivity Thru | Units per assy | Additional Lockheed effectivity From | Thru | From | Thru | Cust. ES by— | Sups. or supsd. by part number |
|---|---|---|---|---|---|---|---|---|---|---|---|---|---|---|---|
| 69056T | N | | | 1 | Instrument panel, CTR main | A | | | RF | | | | | | |
| 69056L | N | 1 | 802924-1 | 1 | Instrument Assy, pilots | | | | | | | | | | |
| 69056 | | | | | Center panel | | | | | | | | | | |
| 69056 | | | | | (Reqd. in 25-10-00 Fig. 2) | | | | | | | | | | |
| 69056L | N | 1 | 819743-1 | 1 | Instrument Assy, pilots | B | | | RF | | | | | MB | 834283-3 |
| 69056 | | | | | Center panel | | | | | | | | | | |
| 69056 | | | | | (Reqd. in 25-10-00 Fig. 2) | | | | | | | | | | |
| 69056L | N | 1 | 802924-7 | 1 | Instrument Assy, pilots | C | | | RF | | | | | MB | 834273-1 |
| 69056 | | | | | Center panel | | | | | | | | | | |
| 69056 | | | | | (Reqd. in 25-10-00 Fig. 2) | | | | | | | | | | |
| 69056L | N | 1 | 829785-3 | 1 | Instrument Assy, pilots | D | | | RF | | | | | MB | 834273-3 |
| 69056 | | | | | Center panel | | | | | | | | | | |
| 69056 | | | | | (Reqd. in 25-10-00 Fig. 2) | | | | | | | | | | |
| 69056L | N | 1A | 834273-3 | 1 | Service mod. instl., N.T.S. | | 1002 | 1002 | RF | 1006 | 1008 | 1016 | 1024 | | |

The figure identification record (FIR) data and the catalog text record data may include data as to the position of an illustration in the catalog, the number of pages required for the illustration, and a complete textual description of the illustration. For example, the FIR data may identify the chapter, section, subject and figure number of the related text information. This record may also contain the number of pages of artwork applicable to the figure and may be utilized for control purposes in preparing the catalog as hereinafter described. Use of the FIR data permits the ready revision or reassignment of control numbers for any text information and permits the storage of data by chapter, section, subject and figure numbers.

The catalog text records associated with a particular figure identification record FIR may be encoded according to source and/or application and entire entries, portions of an entry or individual lines of an entry may be coded for customizing a catalog. The catalog text record data may include one or more of the codes previously described in connection with the record code description RCD data of Table I. Additional codes may be utilized by adding these codes to the RCD data. In addition to the record codes, the catalog text records may include the PROP codes (utilized to paginate as is hereinafter described), model numbers, serial numbers (effectively data) and indication as to whether or not the part is illustrated (NON ILL), customer codes and various other text data and/or control data employed in reproducing the data in the form of a catalog.

Examples of the format of figure identification record (FIR) data and catalog text records are provided in Table V, sections (A) and (B), respectively, as follows:

C. Master Tape Data Format

The edited master tape generated from the data in the data bank 40 contains eight logical records per physical block and is preferably a nine track 800 BPI tape with EBCDIC character code. Each logical record may contain 128 bytes and may be separated into four sections as follows.

1. Carriage Control — byte 1.
2. Accounting Data — bytes 2 through 30.
3. Text Data — bytes 31 through 112.
4. EDP Accounting Data — bytes 113 through 128. (Not described.)

The codes employed in these four sections and a description of these sections is as follows:

1. Carriage Control — byte 1

The control character of each logical record specifies line spacing for printing of test as well as special functions. The carriage control codes are:

TABLE VI

| CARRIAGE CONTROL CODE | DESCRIPTION |
|---|---|
| + | Print text on current line. |
| (blank) | Skip one line and print text. |
| 0 (zero) | Skip two lines and print text. |
| — (minus) | Skip three lines and print text. |
| 1 | Advance film. Print text in line position one of new page. |
| 2 | Skip to line position in mode 3 and print special footing at bottom of page. If a CTC record, draw chapter number and the word contents one-fourth inch high. |

Table VI—Continued

| CARRIAGE CONTROL CODE | DESCRIPTION |
|---|---|
| 3 | Advance film. Skip to line position in mode 4 and print first line of text. Draw logo. If a CTC record, increment counter of the number of table of contents pages (ICNT) by one. If NIA or NIN record, then the following events occur: 1. Reset line counter. 2. Print column headings. 3. Draw softward form no. 1. 4. Print note "Item Not Illustrated." 5. Print first line. If NIA record, increment counter of the number of alphabetic index pages (NACT) by one. If NIN record, increment counter of the number of numeric index pages (NNCT) by one. |
| A | Advance film. Reset line counter. No printing. No form flash. |
| P | No printing. Type the first 71 text characters on the ASR and halt program. |
| T | The first eight non-blank characters in the text field is the catalog ID. These are the quarter inch characters. If column 26=26–1, then draw software form no. 2. If column 26=2, then draw software form no. 3. 1. Generate one-fourth inch catalog ID. 2. Reset line counter. 3. Print column headings. 4. Print note "Item Not Illustrated." 5. Increment counter of T pages (TCNT) by one. The first eight non-blank characters in the text data field of the record is the catalog ID. The following events occur: 1. Advance film. 2. Draw logo. 3. Generate one-fourth inch catalog ID. 4. Print message "XX XX XX XXX X XX" from bytes 10–25 and halt the program. 5. Flash illustration. 6. Reset line counter. 7. Increment counter of I pages (ICNT) by one. |
| X | 1. Advance film. 2. Draw logo. 3. Type text field in center of page. 4. Generate one-fourth inch catalog ID from bytes 10–18. 5. Increment counter of X pages (XCNT) by one. |
| F | 1. Advance film. 2. Print message "XX XX XX XXX X XX" on the ASR and halt program. 3. Flast illustration. 4. The count of F pages (FCNT) is incremented by one. |

2. Accounting Data — bytes 2–30

TABLE VII

| BYTES | | DESCRIPTION |
|---|---|---|
| Bytes 2–2 | | Last two digits of year |
| Bytes 4–6 | | Day (Julian) |
| Bytes 7–9 | | Code |
| Bytes 10–19 | | Catalog identification |
| | 10–11 | CH — (Chapter) |
| | 12–13 | SC — (Section) |
| | 14–15 | SJ — (Subject) |
| | 16–18 | FIG. — (Figure-Number) |
| | 19 | Page number |
| Bytes 20–23 | | MFP code (multiple forms projector — not currently in use) |

Table VII—Continued

| | |
|---|---|
| Bytes 24–25 | Illustration code |
| Byte 26 | Type of text page<br>1 = Without airline part number.<br>2 = With airline part number. |
| Bytes 27–30 | Not used |

3. Text Data — bytes 31–112

The format description of the text data depends upon the carriage control. The text field contains data to be printed on film except for the P, I, T, A and F carriage controls as is noted below:

TABLE VIII

| CARRIAGE CONTROL | BYTE | DESCRIPTION |
|---|---|---|
| P | 31–101 | (Operator Instructions) |
| | 102–112 | Ignored |
| T or I | 31–112 | First eight non-blank characters is the catalog ID. |
| A or F | 31–112 | Ignored |
| All others | 31–112 | Printable characters |

III. Catalog Customizing

A. Control Unit

Figure 4:
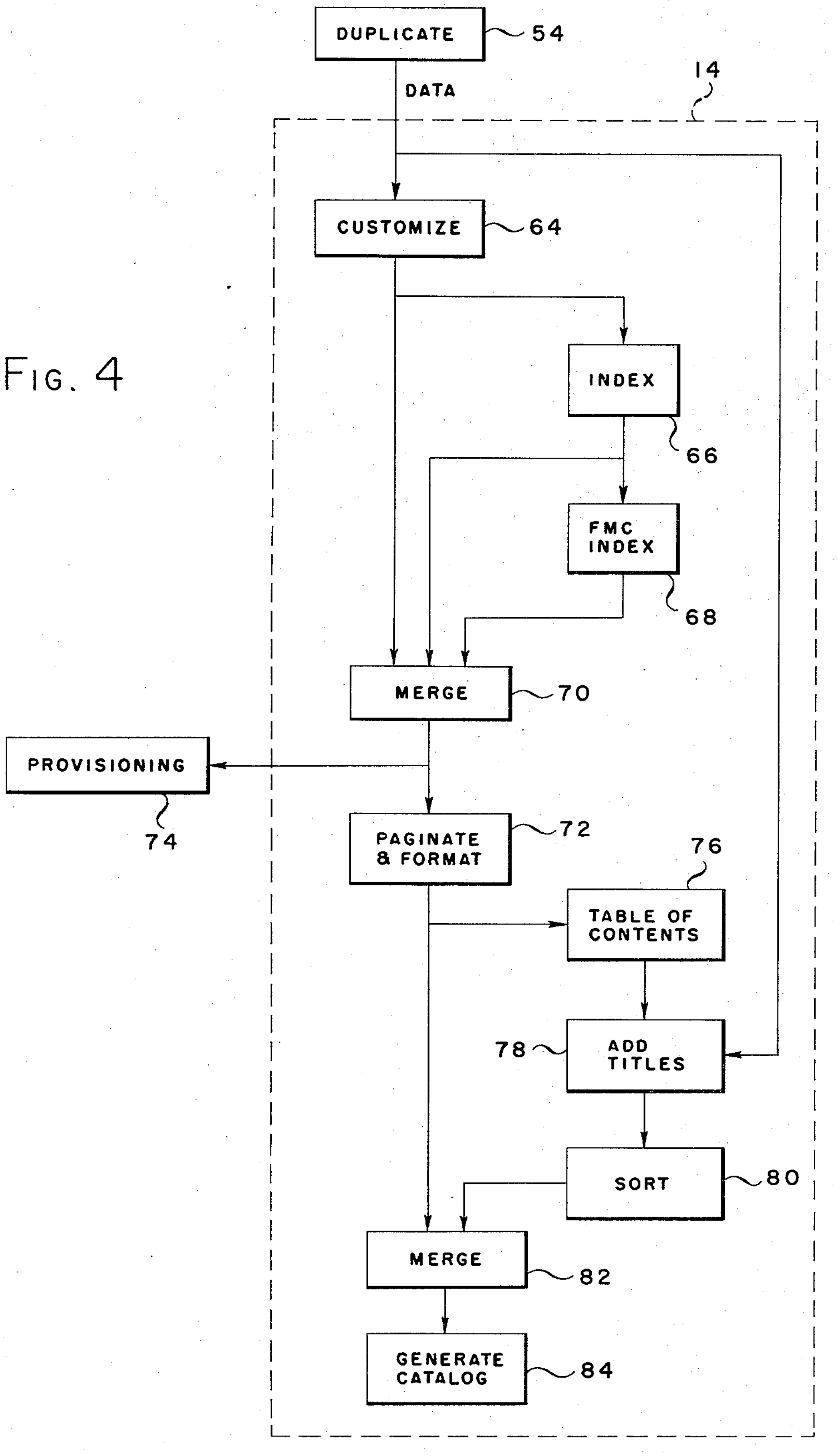
FIG. 4 is a flow diagram functionally illustrating in greater detail the operation of the control unit of FIG. 1.

The data duplicated from the data bank 40 on the master tape may be read by the tape reader 16 of FIG. 1 to provide the data signal to the control unit 14. As is illustrated in FIG. 4, the control unit 14 receives the data signal as it is read from the tape and builds a customized record for a particular customer as is indicated at 64. A customer may be designated by the operator as was previously described or, preferably, may be automatically designated by the entry data and time span data provided in the record code description RCD data and the catalog schedule record SCR data as was previously described.

A parts index and/or other indices specified by the customer may then be tabulated as is indicated at 66 and a federal manufacturers' code (FMC) index may also be tabulated as is indicated at 68. The customized data and the indices may then be merged as is indicated at 70 to provide a complete customized record with the desired indices.

The complete customized record may then be separated into consecutive pages of material each of a predetermined length and may be placed in a predetermined format as is indicated by the paginate and format block 72. In addition, the complete customized record may be utilized to determine provisioning or inventory needs as is indicated at 74.

The paginate and format block determines the page numbers upon which particular data is to appear and this information may then be utilized to generate a table of contents as is generally indicated at 76. Titles corresponding to illustration and test designations in the DATA signal may then be added to the table of contents and the table of contents may be sorted to place all data in proper sequence as is generally indicated at 78 and 80, respectively. The paginated and formatted data may then be merged with the table of contents as is indicated at 82 and the merged data may be utilized to generate a catalog as is indicated at 84.

The operator may set various modes at the input/output unit 36 of FIG. 1 to control the operation of the processor or control unit 14. For example, during the production of a customized catalog as is generally indicated at 84, a slide number designating an illustration for a particular page may be displayed by typing or the like at the input/output unit 36. The program of the control unit 14 is discontinued at that time allowing the operator to change slides and is thereafter continued in response to a control signal from the operator. Moreover, the operator may initially set up a format for each page through the use of the input/output unit 36 by designating various values of a mode matrix. This processor mode matrix preferably takes the form illustrated in the following table:

TABLE IX.—PROCESSOR MODE MATRIX

| Mode array current | Address default | Name | Index | Use | Permissible values | |
|---|---|---|---|---|---|---|
| 420 | 625 | VCNT | 1 | Volume count | 1–N | D |
| 421 | 626 | MVOL | 2 | Max. volumes allowed | 1–N | D |
| 422 | 627 | CH2 | 3 | Skip channel 2 | 74 ($60_{10}$) $N<$mode 47 | D |
| 423 | 630 | CH3 | 4 | Skip channel 3 | 10 ($8_{10}$) $N<$mode 47 | D |
| 424 | 631 | ICNT | 5 | Count of I records | 0–N | D |
| 425 | 632 | TCNT | 6 | Count of T records | 0–N | D |
| 426 | 633 | ICNT | 7 | Count of CTC records | 0–N | D |
| 427 | 634 | XCNT | 10 | Count of X records | 0–N | D |
| 430 | 635 | NACT | 11 | Count of alphabetic index pages | 0–N | D |
| 431 | 636 | NNCT | 12 | Count of numeric index pages | 0–N | D |
| 432 | 637 | FCNT | 13 | Count of F records | 0–N | D |
| 433 | 640 | LRUN | 14 | Halt switch =0 wait for operator to change slide; =1 do not wait for operator. | 0 | D |
| 434 | 641 | | 15 | Not used | 0 | D |
| 435 | 642 | | 16 | do | 0 | D |
| 436 | 643 | | 17 | do | 0 | D |
| 437 | 644 | | 20 | do | 0 | D |
| 440 | 645 | | 21 | do | 0 | D |
| 441 | 646 | | 22 | do | 0 | D |
| 442 | 647 | | 23 | do | 0 | D |
| 443 | 650 | | 24 | do | 0 | D |
| 444 | 651 | | 25 | do | 0 | D |
| 445 | 652 | | 26 | MCS mode | 0 | D |
| 446 | 653 | | 27 | do | 0 | D |
| 447 | 654 | | 30 | do | 0 | D |
| 450 | 655 | 4P6P | 31 | 4P6P (6 perf frame advance) | 6–$N<10$ | D |
| 451 | 656 | | 32 | MCS mode | 0 | D |
| 452 | 657 | XSP | 33 | X character spacing | 36 ($30_{10}$) $N<120$ | D |
| 453 | 660 | | 34 | Not used | 0 | D |
| 454 | 661 | YSP | 35 | Y character spacing | 62 ($50_{10}$) $N<120$ | D |
| 455 | 662 | | 36 | Not used | 0 | D |
| 456 | 663 | XMIN | 37 | Left margin for test | 2664 ($1460_{10}$) 0 to 7777 | D |
| 457 | 664 | YMIN | 40 | Bottom margin for test | 604 ($388_{10}$) 0 to 7777 | D |
| 460 | 665 | XMAX | 41 | Right margin for test | 7777 ($4095_{10}$) N | D |
| 461 | 666 | YMAX | 42 | Top margin for test | 7162 ($3698_{10}$) 0 to 7777 | D |
| 462 | 667 | LR | 43 | Logical record size | 200 ($128_{10}$) N | D |
| 463 | 670 | BL | 44 | Block length | 2000 ($1024_{10}$) | D |
| 464 | 671 | | 45 | Not used | | |
| 465 | 672 | | 46 | do | | |
| 466 | 673 | LPPG | 47 | Lines per page | 100 ($64_{10}$) N | D |

NOTE: All values in table are octal unless otherwise noted: D=Default value; YMAX is top of page; XMIN is left edge.

tected serial number results in the application of the data to the format and build complete detailed record block 92 in a manner similar to the detection of a customer code. Finally, the data may be check for additional codes such as model number codes if neither a customer code nor a serial number is detected and if an additional code applicable to that customer catalog is detected, this data block is utilized to format and built the complete detailed record. If none of the codes nor serial numbers applicable to that particular customer catalog are detected, the data is disregarded as is indicated at 94. The complete detailed customized record 1. Data Customizing As was previously described, the data supplied to the control unit 14 includes data applicable to all customer catalogs and includes customer codes designating customers to which particular blocks of data are applicable. Moreover, the data may contain additional codes designating the data as being applicable to all customer catalogs.

Figure 5:
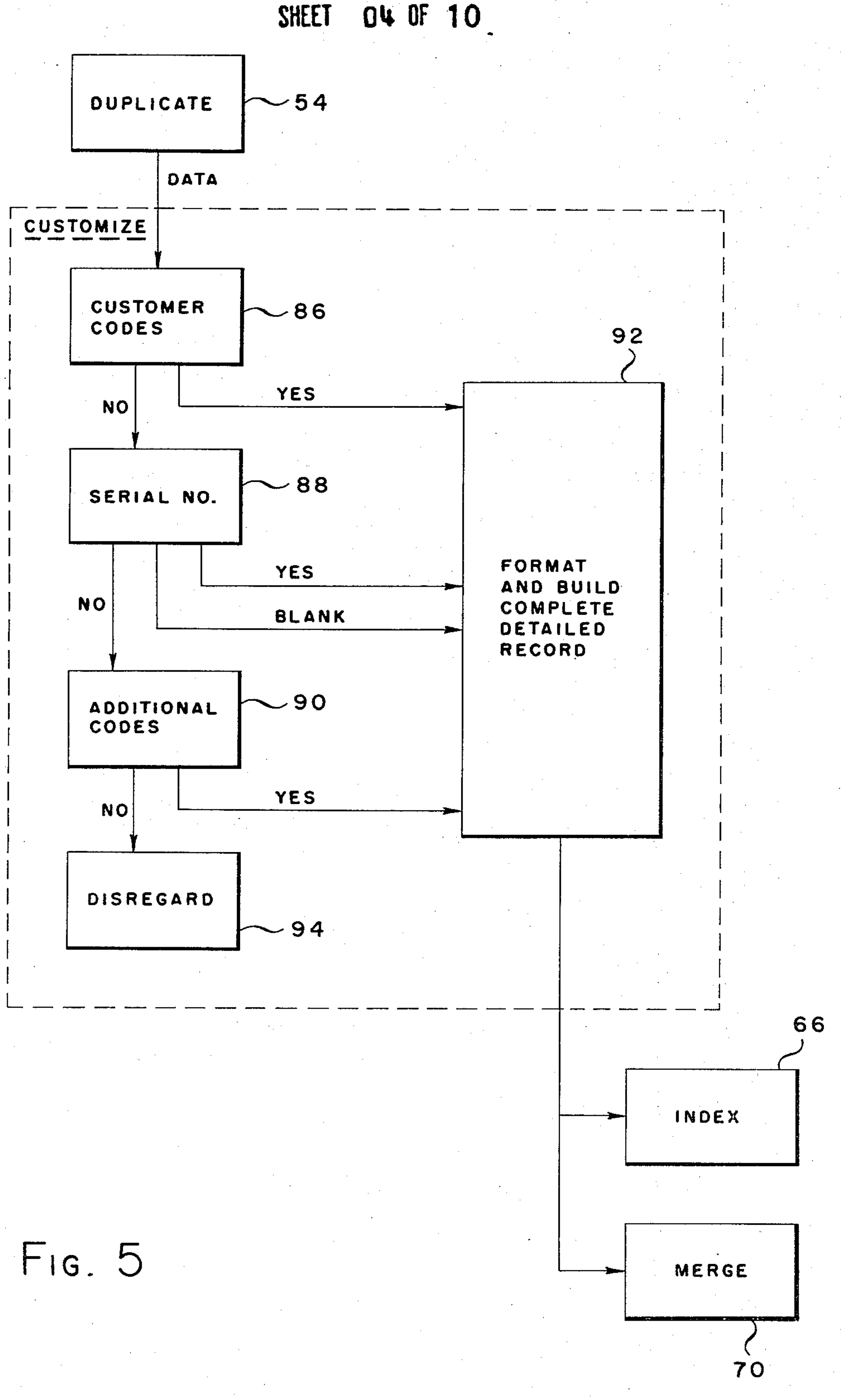
FIG. 5 is a flow diagram functionally illustrating in greater detail the operation of the customize function of FIG. 4.
Figure 6:
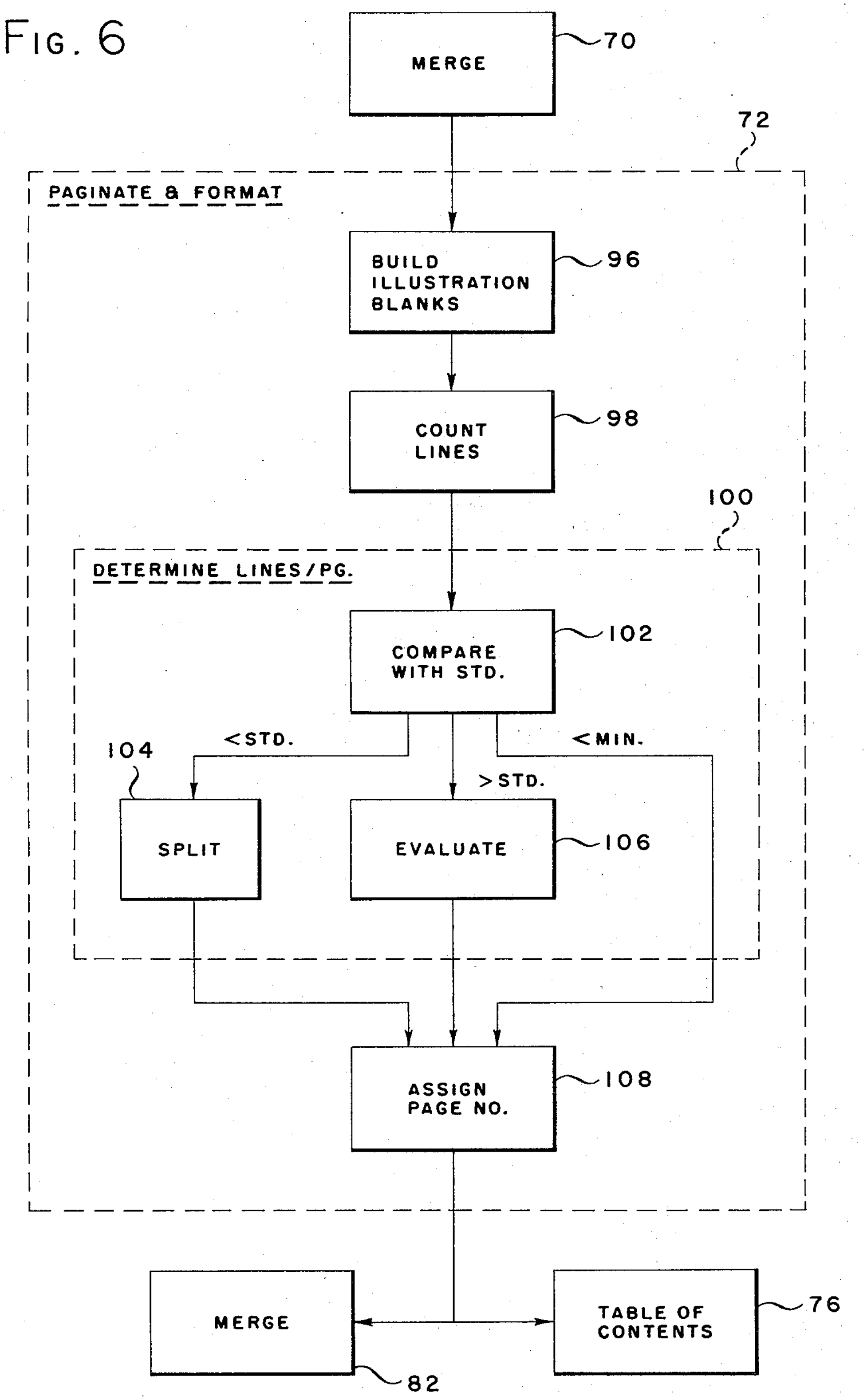
FIG. 6 is a flow diagram functionally illustrating in greater detail the paginate and format function of FIG. 4; and, FIGS. 7A–7E illustrate exemplary catalog pages produced in accordance with the present invention.

Referring now to FIG. 5, the catalog customizing routine indicated at 64 in FIG. 4 utilizes the various customer codes and additional codes to build the complete detailed record of data required for a particular customer. The DATA signals from the tape containing the complete general catalog record is checked for a customer code applicable to the customer for which the catalog is being produced and is checked for serial number codes or other additional codes designating the data as applicable to all customers as is indicated, respectively, at 86, 88 and 90.

If the proper customer code is detected, the block of data is utilized to format and build a complete detail record for that customer catalog as is indicated at 92. If the proper customer code for the catalog being produced is not detected, the data is checked for a serial number applicable to that customer catalog. A demay then be utilized to generate the complete customized indexed record as was previously described.

2. Catalog Paginating and Formatting

The merged customized and indexed record from the merge block 70 may then be utilized by the paginate and format block 72 to separate the record into pages of data as they will appear in the customized catalog. As is illustrated in greater detail in FIG. 6, the customized data including the desired indices is utilized to build illustration blanks, i.e., blanks for insertion of illustrations in the textual material, and the number of lines required to insert textual data associated with an illustration are counted as is generally indicated at 96 and 98, respectively. When the illustration blanks have been provided and the required number of lines counted, the paginate and format routine determines the number of lines of textual material which can be placed on a page so that a predetermined amount of textual data may be assigned to a page as is generally indicated at 100.

To accomplish this pagination in accordance with the preferred embodiment of the invention, the number of lines which will fit on a catalog page is established as a standard or maximum page length MPL. The number of lines required to print the textual description of an illustration (hereinafter referred to as a figure's worth of data) is compared with the maximum page length MPL to approximate the number of pages required for the illustration and the total figure count TFC is divided by the approximate number of pages to establish a text page length for each page assuming that the figure's worth of data required more than one page. The data is then arbitrarily split at the line corresponding to the text page length of each page and various comparisons are made at that line.

If the comparisons result in additional lines being added to the text page length, and the additional lines exceed the standard or maximum page length MPL, the page is split at an appropriate point and assigned a page number. The process is continued from the line at which the page was split until the entire illustration has been assigned page numbers. If, of course, the total figure count is less than the standard, the illustration may be assigned a page number. If the total figure count is greater than the standard, an evaluation must be made to determine where to split the figure for subsequent printing and the resultant pages are assigned page numbers as is generally indicated at 106. All of the data with the assigned page numbers may thereafter be merged with table of contents data as was previously described. To facilitate an understanding of the pagination routine, an example of the preferred routine for determining the length of a page is described hereinafter in connection with the following Table X in which only the data necessary to determine page length is given:

TABLE X

| CONSECUTIVE DATA LINE NUMBERS | PAGE LINE NOS. | ATS PROG | ITEM | NOTE |
|---|---|---|---|---|
| 1 | 1 | 1001 | 5 | |
| 2 | 2 | 2002 | 10 | |
| 3 | 3 | 2001 | | |
| 4 | 4 | 3003 | 15 | |
| 5 | 5 | 3002 | | |
| 6 | 6 | 3001 | | |
| 7 | 7 | 4001 | 20 | US |
| 8 | 8 | 5001 | 25 | |
| 9 | 9 | 6001 | 30 | |
| 10 | 10 | 7001 | 35 | |
| 11 | 11 | 8001 | 40 | |
| 12 | 12 | 9001 | 45 | |
| 13 | 13 | 10001 | 50 | |
| 14 | 14 | 11001 | 55 | |
| 15 | 15 | 12004 | 60 | bb |
| 16 | 16 | 12003 | | |
| 17 | 17 | 12002 | | |
| 18 | 18 | 12001 | | |
| 19 | 1 | 13001 | 65 | |
| 20 | 2 | 14001A | 70 | |
| 21 | 3 | 15001A | 75 | |
| 22 | 4 | 16001A | 80 | |
| 23 | 5 | 17001 | 85 | |
| 24 | 6 | 18001 | 90 | MK |
| 25 | 7 | 19001 | 95 | US |
| 26 | 8 | 20002 | 100 | |
| 27 | 9 | 20001 | | |
| 28 | 10 | 21003 | 105 | |
| 29 | 11 | 21002 | | US |
| 30 | 12 | 21001 | | |
| 31 | 13 | 22002 | 110 | |
| 32 | 14 | 22001 | | |
| 33 | 1 | 23002 | 115 | |
| 34 | 2 | 23001 | | |
| 35 | 3 | 24001A | 120 | |
| 36 | 4 | 25002A | 125 | |
| 37 | 5 | 25001A | 127 | |
| 38 | 6 | 26001A | 129 | |
| 39 | 7 | 27022 | 130 | |
| 40 | 8 | 27021 | | |
| 41 | 9 | 27020 | | |
| 42 | 10 | 27019 | | |
| 43 | 11 | 27018 | | US |
| 44 | 12 | 27017 | | US |
| 45 | 13 | 27016 | | US |
| 46 | 14 | 27015 | | US |
| 47 | 15 | 27014 | | US |
| 48 | 1 | 27013 | | US |
| 49 | 2 | 27012 | | US |
| 50 | 3 | 27011 | | US |
| 51 | 4 | 27010 | | US |
| 52 | 5 | 27009 | | US |
| 53 | 6 | 27008 | | US |
| 54 | 7 | 27007 | | US |
| 55 | 8 | 27006 | | |
| 56 | 9 | 27005 | | |
| 57 | 10 | 27004 | | |
| 58 | 11 | 27003 | | |
| 59 | 12 | 27002 | | |
| 60 | 13 | 27001 | | |
| 61 | 14 | 28001 | 135 | |

Referring now to Table X, a complete figure's worth of data may be stored and the total number of lines required to print the data may be counted to establish a total figure count TFC. The total figure count TFC may then be utilized to approximate the number of pages required for printing the entire figure. For example, the maximum page length MPL for a catalog page may be assumed to be 18 lines for the purpose of explanation. Assuming that the total figure count TFC is 61 lines, approximately four pages will be required to print the total figure. An approximate text page length TPL may then be established by dividing the total figure count TFC by the total number of pages required resulting in an approximate text page length TPL equal to 15 lines.

With this information established, the data describing each line of the figure may be scanned at line 15, i.e., at the line corresponding to text page length TPL. The PROG data associated with line 15 of the figure is greater than 1, indicating that more than one line is required to complete this item on that particular page. The difference between the PROG number and 1 (4 − 1) is three and this number is added to the text page length TPL of 15 to establish a new text page length of 18 for that particular page. The new text page length TPL of 18 is equal to or less than the maximum of 18 lines for a page and that much of the figure will thus fit on a single page. The PROG number is 1 and since there are no further codes indicating that more lines are required, lines 1–18 of the figure may be assigned a page number.

Another scan is thereafter made at line 33, i.e., 18 + 15, and it is noted that the PROG number is greater than one. The difference between one and the PROG number (2 − 1) is added to the text page length of 15 to establish a new text page length of 16 which is equal to or less than the maximum of 18. The immediately next line, i.e., line 35, is checked for an item number variant having a predetermined value and it is noted that the item number variant is not present. However, the A following the PROG number indicates an attaching part requiring at least three more lines. Since three more lines would cause the page length to exceed the maximum page length of 18 lines, the text page length TPL is reduced from the original length of 15 lines by one line, for example, resulting in a tentative page cut at line 32. Since all of the codes indicate that line 32 is a satisfactory point at which to cut the page, the second page will extend from lines 19 through line 32 of the data.

The next scan is made at line 47 and it is determined that a note code of US (used one-part number; from RCD data) is present. This note code may, for example, indicate that the page may be cut at this line with no further consideration. Thus, lines 33–47 may be assigned a page number. This last page will, of course, merely include the remaining lines of the data, i.e., lines 48–61, since this total is less than the maximum page length MPL of 18 lines.

B. Output Format

As was previously mentioned, the format of the customized catalog produced in accordance with the present invention may be specified by the customer and may include various types of pages of textual and illustrative material recorded on microfilm or printed as a hard copy. The various types of pages may typically include table of contents pages, introduction pages, illustration pages, catalog text pages and numerically or otherwise ordered indices. The illustrations are produced from slides as was previously described. However, various headings, titles, catalog identification numbers and certain forms may be generated on the face of the cathode ray tube 12 of FIG. 1 by the program utilizing vectors.

Typically pages of textual material produced in accordance with the present invention are illustrated in FIGS. 7A–7E. A first type of text page illustrated in FIG. 7A may include a form separating the titles and various columns of textual material, column headings, a page heading, a one-quarter inch catalog identification and various other textual material including a catalog page number. The column headings and certain other textual material such as the "Item Not Illustrated" note may be generated from constants stored in the control unit 14 memory. The form enclosing the various headings and columns of material as well as the quarter inch catalog identification in the lower right hand corner of the illustrative text page of FIG. 7A may be drawn on the face of the cathode ray tube 12 of FIG. 1 using vectors. The page headings, i.e., "Lockheed L1011" with logo and "Illustrated Parts Catalog," may be generated as part of the control unit 14 program and the data printed in the various columns may be extracted from the various text records previously described. The exemplary table of contents page illustrated in FIG. 7B may be produced in a similar manner with the exception that the form and quarter inch catalog identification may not be required.

Figure 7C:
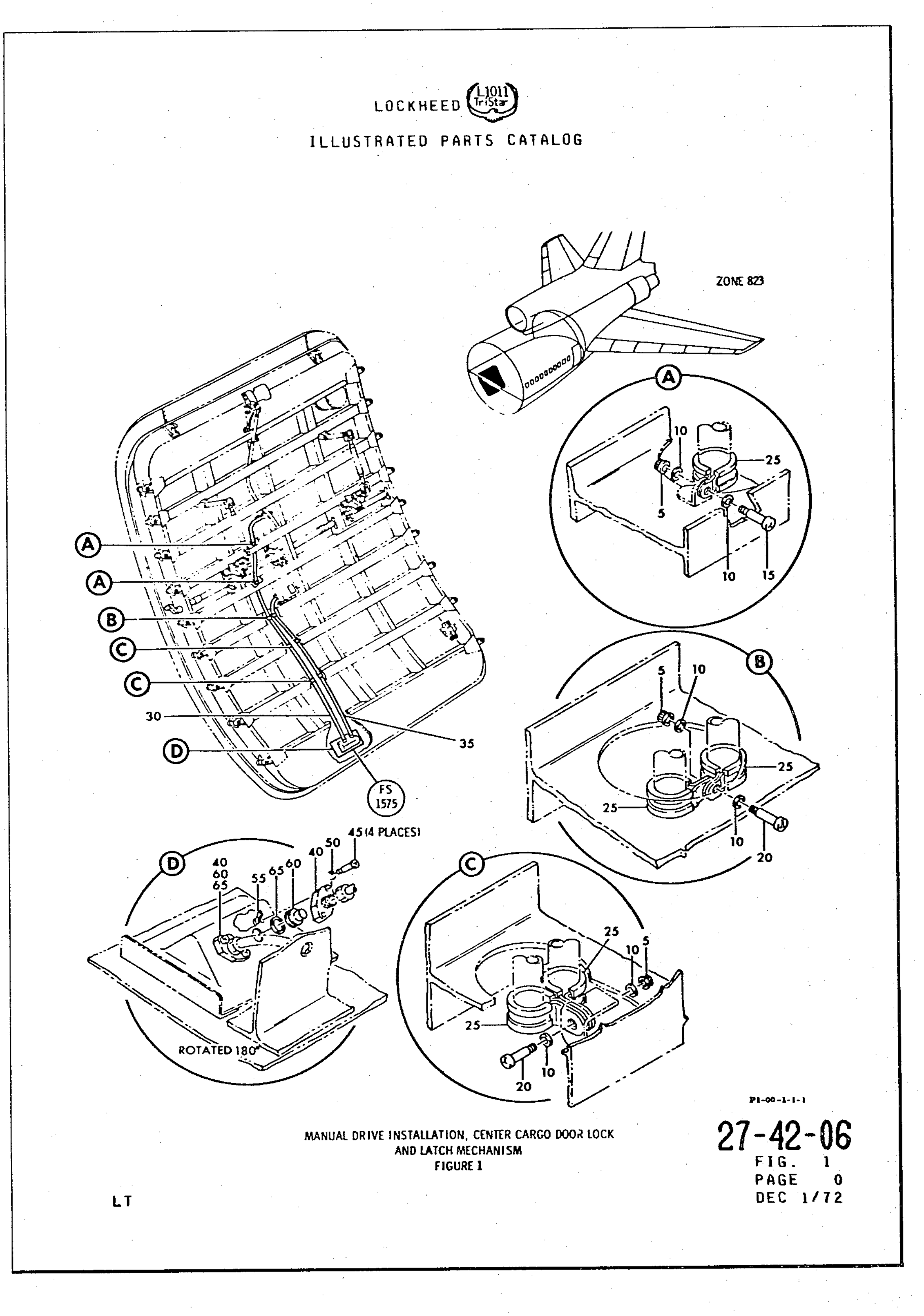

An exemplary illustration page is illustrated in FIG. 7C. On this type of page, a quarter inch catalog identification may be drawn utilizing vectors and may be displayed on the face of the cathode ray tube 12 of FIG. 1 together with the page heading and description of the figure. The figure itself may then be combined with the textual data displayed on the face of the cathode ray tube 12 as was previously described in connection with FIG. 1.

FIGS. 7D and 7E illustrate exemplary numeric and alphabetic index pages, respectively. These indices may include the vector drawn form and various textual data previously described. The order of the listed parts may be of course be either numerical or alphabetical as illustrated.

IV. Program Listing

A preferred computer program for producing customized, illustrated texts is listed hereinafter in Table XI. This program is written in "COBOL" (common business oriented language) for use on any suitable conventional general purpose digital computer provided with a COBOL compiler.

It should be understood that the program of Table XI is provided to enable one skilled in the art to practice the present invention and is not intended to be restrictive with respect to the selection of the computer program language employed or the specific program compilation.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method for producing customized texts from input data relating to a plurality of customers comprising the steps of:

storing input data including textual material relating to a plurality of customers;

selecting the stored data relating to one of the plurality of customers from the stored input data;

generating an ordered index in response to the selected stored data;

merging the selected stored data with the generated ordered index;

separating the merged stored data and the ordered index into consecutively numbered page-sized portions;

generating a table of contents in response to the consecutively numbered page-sized portions;

merging the merged stored data and ordered index with the generated table of contents; and, photographically reproducing the merged stored data, ordered index and table of contents.

2. The method of claim 1 wherein the input data includes both the textual material and illustration identifying data and wherein the step of separating includes specifying at least some of the page-sized portions as illustration pages in response to the illustration identifying data.

3. The method of claim 2 wherein the input data includes both the textual material and illustration identifying data and wherein the merged stored data, ordered index and table of contents are photographically reproduced by:

consecutively electronically displaying each page-sized portion of textual material on the face of a cathode ray tube;

recording the displayed textual material on a photographic record; and, selectively projecting one of a plurality of illustrations selected in response to the illustration identifying data onto the photographic record at a position in the photographic record determined by one of the specified illustration pages, the photographic record thereby being a composite record of textual material and illustrations.

4. The method of claim 3 wherein the photographic record comprises a sequence of film frames and wherein the photographic record is recorded by:

exposing one frame of the sequence of film frames to one page-sized portion of the merged stored data, ordered index and tables of contents;

advancing the photographic record at least one frame; and, repeating the steps of exposing and advancing until all of the merged stored data, ordered index and table of contents is recorded.

5. A high speed method of producing customized illustrated texts comprising the steps of:

*a.* providing a machine readable, coded record of textual and illustrative material applicable to all customers, the record including illustration identifying indicia;

*b.* providing a plurality of optically projectable illustrations;

*c.* machine reading the record;

*d.* generating a customized record applicable to one of a plurality of customers in response to predetermined codes in the machine read record;

*e.* electronically displaying the textual material in the customized record on the face of a cathode ray tube, the display of the textual material being simultaneously photographically recorded to produce a photographic record; and

*f.* selectively projecting one of the plurality of illustrations onto the photographic record in response to an illustration identifying indicia in the customized record, the photographic record thereby being a composite exposure of the textual material and the illustration.

6. The method of claim 5 wherein the customized record is generated by:

selecting portions of the machine read record applicable to the one of the plurality of customers in response to at least one of the codes in the machine read record;

generating an ordered index from the selected portions of the machine read record;

merging the ordered index with the selected portions of the record;

separating the merged index and selected portions of the record into consecutive page-sized portions of textual material and illustration blanks;

generating a table of contents from the separated, consecutive page-sized portions; and, merging the table of contents with the separated, consecutive page-sized portions to thereby generate the customized record.

7. The method of claim 6 wherein the codes in the machine read record include customer codes applicable to only one customer and universal codes applicable to all customers.

8. The method of claim 6 wherein the merged index and selected portions of the record are separated into consecutive page-sized portions by:

providing textual data in the coded record including a plurality of lines of textual material greater in number than a predetermined maximum page length, each line of textual material including at least one of a plurality of codes indicating the number of subsequent lines of textual material required to complete a textual entry;

counting the total number of lines of textual material in the stored textual data;

comparing the total number of lines counted with the predetermined maximum page length to establish an approximate integral number of pages required to reproduce the stored textual data on consecutive pages;

dividing the total number of lines counted by the established approximate integral number of pages to establish a text page length;

scanning a first line of textual material corresponding in line number to the established text page length to detect at least one of the plurality of predetermined codes associated therewith;

assigning a first page number to the textual material preceding and including the first scanned line if the detected code associated with the first scanned line indicates that the first scanned line is not associated with subsequent, required lines of textual material;

scanning a second line of textual material if the detected code indicates that the first scanned line is associated with subsequent, required lines of textual material, the second scanned line being identified as the first scanned line plus the number of lines indicated by the detected code of the first scan line if the identified second scanned line does not exceed the maximum page length plus one;

assigning a first page number to the textual material preceding the second scanned line if the second scanned line does not include data indicative of subsequent, required lines of textual material;

scanning a second line of the textual material identified as the first scanned line less one line if the previously identified second scanned line exceeds the maximum page length plus one;

assigning a first page number to the textural material preceding the second scanned line if the second scanned line does not include data indicative of subsequent, required lines of textual material;

scanning a third line of the textual material identified as the first scanned line less three lines if the second scanned line includes an indication of subsequent, required lines of textual material;

assigning a first page number to the textual material preceding the third scanned line if the third scanned line does not include an indication of subsequent, required lines of textual material; and, repeating as necessary the latter two steps until the scanned line does not include an indication of subsequent, required lines of textual material at which time the first page number is assigned to the textual material preceding the last scanned line.

9. A method for producing customized illustrated parts catalogs comprising the steps of:

storing input data relating to a plurality of customers in a memory, the input data including parts illustration and text records each containing an identifiable record code, an entry date code and an identification code associating each record with at least one of the plurality of customers, at least some of the illustration records including illustration identifying indicia;

duplicating the stored input data on a data carrier in machine readable form;

machine reading the input data from the data carrier;

selecting the machine read input data relating to a predetermined one of the plurality of customers in response to the identification code of each record;

generating an ordered catalog index data from the selected input data in response to the record code of each record;

merging the selected input data with the generated catalog index data;

separating the merged selected input and index data into consecutively numbered page sized portions of textual and illustration blank data;

generating table of contents data in response to the page sized portions of textual and illustration blank data;

machine reading the table of contents data and the consecutively numbered page sized portions of textual and illustration blank data in a desired order of appearance of the data in the customized catalog;

electronically displaying, in the desired order of appearance in the customized catalog, the machine read table of contents data and the consecutively numbered page-sized portions of textual data one page at a time on the face of a cathode ray tube;

photographically recording each page of the electronically displayed data on an individual frame of film;

interrupting the electronic display of the textual data in response to the reading of illustration blank data;

displaying the illustration identifying indicia associated with the read illustration blank data;

selecting from a plurality of slides containing parts illustrations the slide containing an illustration identified by the displayed illustration identifying indicia;

photographically recording the illustration from the selected slide on an individual frame of the film to thereby form a composite record or ordered textual and illustrative material;

continuing to electronically display and photographically record each page of the machine read textual data on individual frames of film after recording the illustration; and, repeating the last mentioned steps of interrupting, selecting, photographically recording and continuing until all of the table of contents data and consecutively numbered page sized portions of textual and illustration blank data has been read.

10. A method for separating textual data into consecutively numbered pages of text approximately equal in length comprising the steps of:

storing textual data in a memory, the textual data including a plurality of lines of textual material greater in number than a predetermined maximum page length, each line of textual material including at least one of a plurality of codes indicating the number of subsequent lines of textual material required to complete a textual entry;

counting the total number of lines of textual material in the stored textual data;

comparing the total number of lines counted with the predetermined maximum page length to establish an approximate integral number of pages required to reproduce the stored textual data on consecutive pages;

dividing the total number of lines counted by the established approximate integral number of pages to establish a text page length;

scanning a first line of textual material corresponding in line number to the established text page length to detect at least one of the plurality of predetermined codes associated therewith;

assigning a first page number to the textual material preceding and including the first scanned line if the detected code associated with the first scanned line indicates that the first scanned line is not associated with subsequent, required lines of textual material;

scanning a second line of the textual material if the detected code indicates that the first scanned line is associated with subsequent, required lines of textual material, the second scanned line being identified as the first scanned line plus the number of lines indicated by the detected code of the first scan line if the identified second scanned line does not exceed the maximum page length plus one;

assigning a first page number to the textual material preceding the second scanned line if the second scanned line does not include data indicative of subsequent, required lines of textual material;

scanning a second line of the textual material identified as the first scanned line less one line if the previously identified second scanned line exceeds the maximum page length plus one;

assigning a first page number to the textual material preceding the second scanned line if the second scanned line does not include data indicative of subsequent, required lines of textual material;

scanning a third line of the textual material identified as the first scanned line less three lines if the second scanned line includes an indication of subsequent, required lines of textural material;

assigning a first page number to the textual material preceding the third scanned line if the third scanned line does not include an indication of subsequent, required lines of textual material; and, repeating as necessary the latter two steps until the scanned line does not include an indication of subsequent, required lines of textual material at which time the first page number is assigned to the textual material preceding the last scanned line.

* * * * *